US009364880B1

(12) United States Patent
Weigel, Jr. et al.

(10) Patent No.: US 9,364,880 B1
(45) Date of Patent: Jun. 14, 2016

(54) SYSTEMS AND METHODS TO COLD WORK METAL/COMPOSITE STRUCTURES (71) Applicant: The Boeing Company, Chicago, IL (US)

(72) Inventors: Matthew J. Weigel, Jr., Bonney Lake, WA (US); Sujith N. Mally, Bellevue, WA (US)

(73) Assignee: The Boeing Company, Chicago, IL (US)

(*) Notice: Subject to any disclaimer, the term of this patent is extended or adjusted under 35 U.S.C. 154(b) by 350 days.

(21) Appl. No.: 13/918,176

(22) Filed: Jun. 14, 2013

(51) Int. Cl.
*B21D 39/00* (2006.01)
*B21C 3/16* (2006.01)
*B21D 39/03* (2006.01)
*B23P 9/02* (2006.01)

(52) U.S. Cl.
CPC .............. *B21C 3/16* (2013.01); *B21D 39/031* (2013.01); *B23P 9/025* (2013.01)

(58) Field of Classification Search
CPC ...... B21D 31/00; B21D 31/03; B21D 39/031; B21D 39/03; B23P 9/025; Y10T 29/49938; B21C 3/16
USPC ........................................................ 72/391.2
See application file for complete search history.

(56) References Cited

U.S. PATENT DOCUMENTS

| 3,024,666 | A | * | 3/1962 | Haskell | B25B 27/0085 227/10 |
|---|---|---|---|---|---|
| 3,566,662 | A | * | 3/1971 | Champoux | B21D 41/02 29/446 |
| 3,805,578 | A | * | 4/1974 | King, Jr. | B23P 9/025 29/446 |
| 4,164,807 | A | * | 8/1979 | King, Jr. | B21J 15/02 29/523 |
| 5,072,993 | A | * | 12/1991 | Dickerson | F16F 7/06 299/37.5 |
| 5,103,548 | A | * | 4/1992 | Reid | B21D 39/06 29/235 |
| 5,433,100 | A | * | 7/1995 | Easterbrook | B23P 9/025 29/446 |
| 5,943,898 | A | * | 8/1999 | Kuo | B23P 9/025 72/370.07 |
| 6,266,991 | B1 | * | 7/2001 | Kuo | B23P 9/025 72/370.07 |
| 7,100,264 | B2 | * | 9/2006 | Skinner | B23P 9/025 16/2.1 |
| 7,302,746 | B2 | * | 12/2007 | Kuo | B23P 9/025 29/243.517 |
| 7,437,904 | B2 | * | 10/2008 | Katzenberger | B23P 9/025 29/523 |
| 7,617,712 | B2 | * | 11/2009 | Glenn | B23P 9/025 29/243.518 |

OTHER PUBLICATIONS

Fatigue Technology Split Sleeve Cold Expansion Overview, http://www.fatiguetech.com 2013.

* cited by examiner

*Primary Examiner* — Edward Tolan
(74) *Attorney, Agent, or Firm* — Toler Law Group, PC (57) ABSTRACT In one example, an adapter assembly for a system for cold working a portion of a metal layer of a metal/composite structure is provided. The portion being cold worked may surround a hole in a structure that includes the metal layer and a non-metal layer. In some examples, the adapter assembly includes a shim adapter housing including a face wall, having a first aperture that is larger than the hole, and a side wall, extending from the face wall. A cavity is at least partially delimited by the face wall and the side wall. The adapter assembly also includes a shim, dimensioned to fit within the cavity. The shim has a second aperture that is larger than the first aperture. Other embodiments may be described.

20 Claims, 6 Drawing Sheets

SYSTEMS AND METHODS TO COLD WORK METAL/COMPOSITE STRUCTURES

BACKGROUND

The subject matter described herein relates to manufacturing techniques and, more particularly, to systems and methods to cold work material stackups, which include metal/composite structures.

Fastener holes in metal structures may be cold worked to improve fatigue performance of the metal structure proximate the area of the fastener holes to reduce the likelihood of failure from stress cracks and the like. Such an operation commonly involves inserting a split metal sleeve and a solid mandrel into the fastener hole and drawing a mandrel through the split sleeve to introduce radial and axial stresses in the metal structure proximate the fastener holes, which strengthens the metal by plastic deformation.

Material stackups may include one or more layers of composite material, such as fiber-reinforced plastic, positioned adjacent a metal layer. In general, structures made of composite material react unfavorably to plastic deformation of the type inflicted during cold working. Thus, existing manufacturing techniques do not allow cold working of metal layers assembled into a metal/composite stack without either time-consuming disassembly of the stack or the use of part-specific tooling.

SUMMARY

Accordingly, systems and methods to cold work metal layers in metal/composite stackups may find utility.

In one example, an adapter assembly for a system for cold working a portion of a metal layer of a metal/composite structure is provided. The portion being cold worked may surround a hole in a structure that includes the metal layer and a non-metal layer. In some examples, the adapter assembly includes a shim adapter housing including a face wall, having a first aperture that is larger than the hole, and a side wall, extending from the face wall. A cavity is at least partially delimited by the face wall and the side wall. The adapter assembly also includes a shim dimensioned to fit within the cavity, the shim having a second aperture that is larger than the hole.

In another example, a system to cold work a metal section proximate a hole in a structure is disclosed. The system includes a split sleeve including a flare and a body. The body has a length $L1$, extending along a central axis, and an outer diameter $D3$, dimensioned to fit within the hole. The system also includes a shim adapter housing including a face wall, adapted to be positioned adjacent the structure and having a first aperture to be positioned adjacent the hole, and a side wall, depending from the face wall to define a cavity. The system also includes a shim plate, dimensioned to fit within the cavity. The shim plate has a second aperture to be positioned adjacent the first aperture.

In another example, a method to cold work a metal section proximate a hole in a structure is disclosed. The method includes positioning a shim adapter housing adjacent the hole in the structure. The shim adapter housing includes a face wall, adapted to be positioned adjacent the structure and having a first aperture to be positioned adjacent the hole, and a side wall depending from the face wall to define a cavity. The method also includes positioning a shim plate within the cavity. The shim plate includes a second aperture to be positioned adjacent the first aperture. The method also includes inserting a split sleeve through the second aperture. The split sleeve includes a flare and a body. The body has a length $L1$, extending along central axis, and an outer diameter dimensioned to fit within the hole. The method also includes drawing a mandrel through the body of the split sleeve, wherein the mandrel causes the split sleeve to apply a compressive force to the metal section of the structure.

In another example, a system for cold working a portion of a metal layer in a structure is disclosed. The portion surrounds a hole in the structure, which further includes a non-metal layer. The system includes a split sleeve including a uniform portion having a length $L1$ and an outer diameter $D3$ dimensioned to be received within the hole, and a shim including an aperture that is larger than the hole.

In another example, a method of cold working a portion of a metal layer having a first thickness $T1$ and located on a first side of a structure is disclosed. The portion surrounds a hole in the structure, which further includes a non-metal layer having a second thickness $T5$. The method includes locating a uniform portion of a split sleeve inside the hole. The uniform portion has a length $L1$, which exceeds the first thickness $T1$. The split sleeve is fixed relative to the structure and extends into the structure from the first side a distance greater or equal to the first thickness $T1$. The method also includes drawing a mandrel through the split sleeve to apply a compressive force to the portion of the metal layer surrounding the hole.

BRIEF DESCRIPTION OF THE DRAWINGS

Examples of methods and systems in accordance with the teachings of the present disclosure are described in detail below with reference to the following drawings.

DETAILED DESCRIPTION

In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Systems and methods to cold work metal/composite structures are described herein. In some examples, systems and methods described herein may be used in the manufacture of metal/composite structures for use in vehicles such as aircraft, ships, automobiles, or any other structures in which adjacent parts must be joined. By way of example, aircraft structures commonly include a skin formed from aluminum, metal, and one or more composite materials attached to an underlying frame structure. As described above, existing manufacturing techniques commonly require the metal/composite structures to be disassembled to permit cold working of the metal layer(s) of the structures. Techniques described herein eliminate, or at least reduce, the need to disassemble and reassemble the structure, thereby increasing the efficiency of the manufacturing process.

Figure 1:
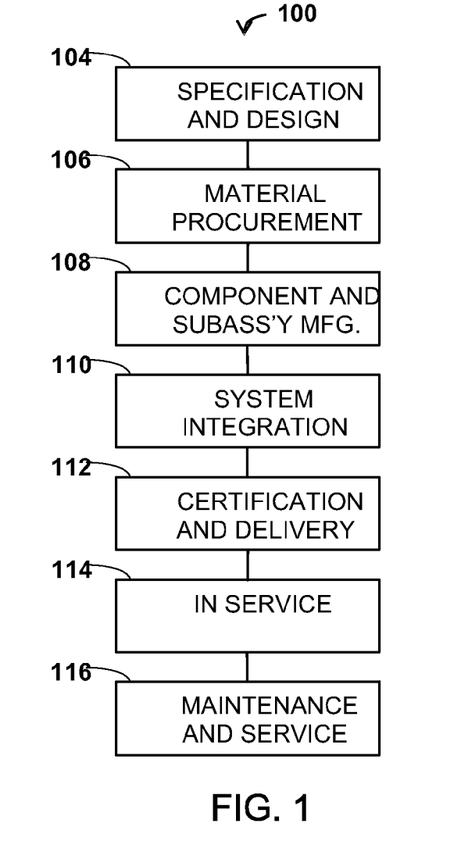
FIG. 1 is a flow diagram of aircraft production and service methodology, according to an aspect of the disclosure.
Figure 2:
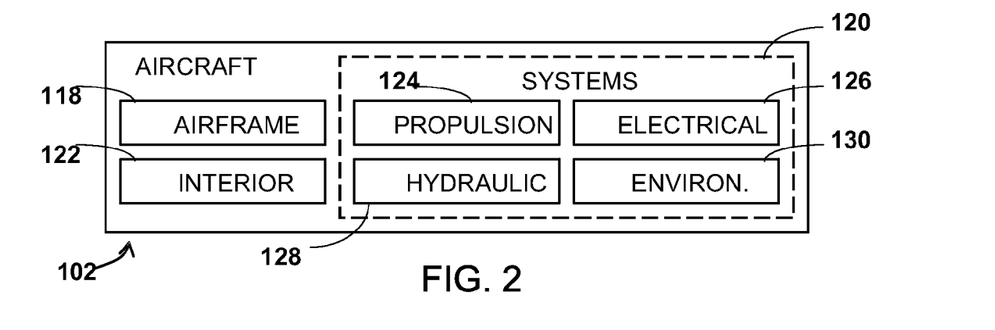
FIG. 2 is a block diagram of an aircraft, according to an aspect of the disclosure.

Referring more particularly to the drawings, examples of the disclosure may be described in the context of an aircraft manufacturing and service method 100 as shown in FIG. 1 and an aircraft 102 as shown in FIG. 2. During pre-production, illustrative method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on. As shown in FIG. 2, the aircraft 102 produced by the illustrative method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus examples, method examples, or a combination thereof may be utilized during the production stages 108 and 110, for example, by substantially expediting assembly of or reducing the cost of an aircraft 102. Similarly, one or more of apparatus examples, method examples, or a combination thereof may be utilized while the aircraft 102 is in service, for example and without limitation, to maintenance and service 116.

In some examples, a system to cold work a metal/composite structure may be embodied as one or more kits which may be distributed to manufacturers and/or construction entities which may have a need to cold work metal/composite structures. By way of example, metal/composite structures are becoming widely used in the aircraft industry due to the high strength-to-weight ratio of composite materials. In some examples, the kits may include split sleeves, formed in one or more predetermined lengths, and one or more shim plates, adapted to be positioned between the split sleeve and the metal/composite structure. The shim plates may have predetermined thicknesses and one or more shim plates may be positioned between the split sleeve and the material stackup to regulate the depth to which the split sleeve penetrates the metal/composite material. In addition, a kit may include one or more shim adapters and one or more shim retainers to facilitate holding the shim plates in place.

In use, an operator may determine a thickness of a metal layer of the material stackup and may select a split sleeve having a body that is at least as long as the thickness of the metal layer. One or more shim plates may be positioned between the flare of the split sleeve and the material stackup such that the split sleeve extends into the material stackup to a depth which is equal to or just slightly exceeds the thickness of the metal layer. A mandrel may then be drawn through the split sleeve to apply a radial and axial force to the metal layer. Because the split sleeve does not extend an appreciable distance into the non-metal layer of the composite material, only the metal layer is affected by the cold working process.

Figure 3A:
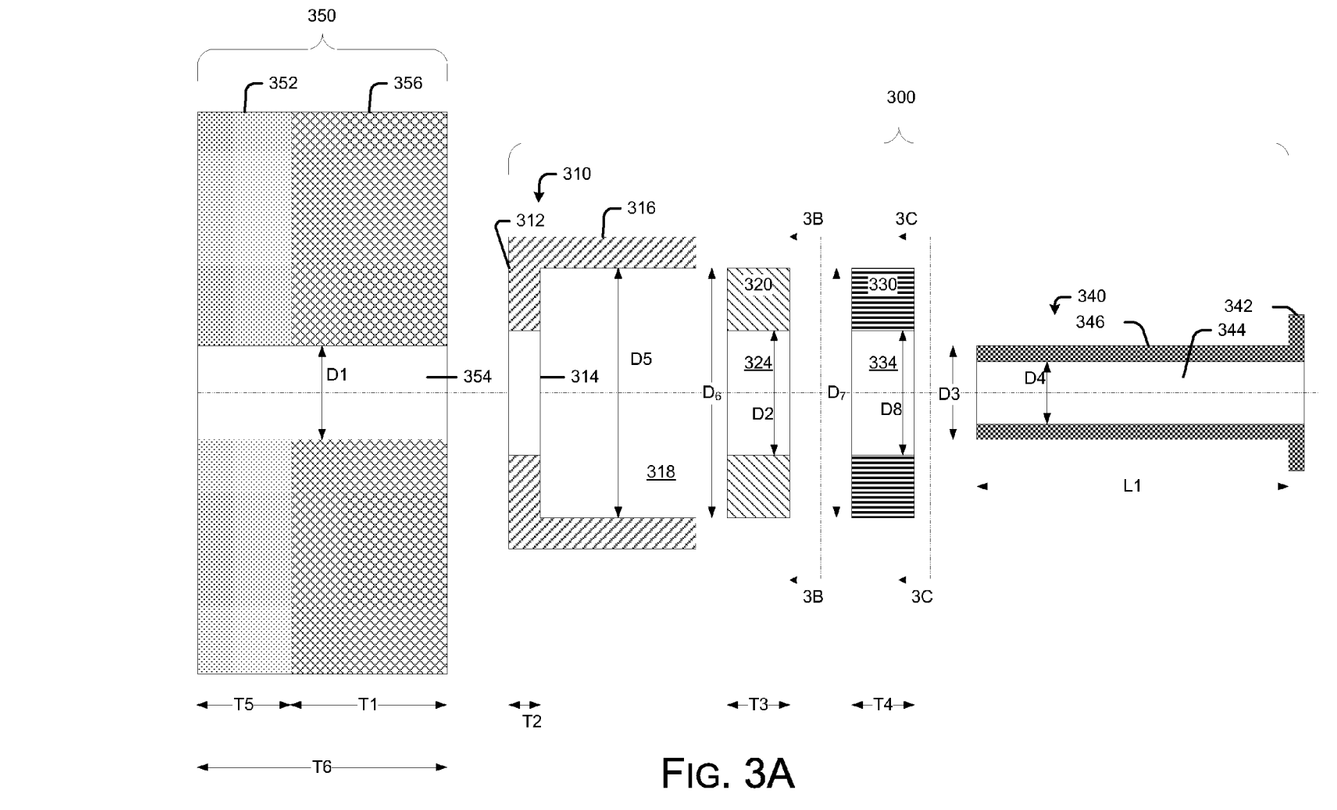
FIGS. 3A-3G are schematic illustrations of systems and methods to cold work metal/composite structures, according to an aspect of the disclosure.

Various aspects of the disclosure will be explained with reference to FIGS. 3A-3F and FIG. 4. FIG. 3A illustrates components of a system 300 to cold work a metal section 356 proximate a hole 354 in a structure 350. In some examples, the structure 350 may be embodied as a metal/composite stackup. Examples of metal/composite stackups may include aircraft components, such as structural members or exterior panels of aircraft. Other examples may include components for waterborne vehicles, e.g., ships, boats, or other marine vehicles, spacecraft, or land based vehicles. Metal/composite structures may also be used in building construction.

The nonmetal layer or section 352 may be formed from a suitable composite material, e.g., a fiberglass material or a fiber-reinforced plastic material. The metal layer or section 356 may be formed from a suitable metal, such as steel, stainless steel, titanium, or aluminum. The metal layer 356 has a thickness indicated by T1 in FIG. 3A. The nonmetal layer 352 has a thickness indicated by T5 in FIG. 3A, and the entire structure 350 has a thickness indicated by T6. The specific thicknesses of the respective layers are a function of the application for the metal/composite structure 350.

In the example depicted in FIG. 3A, the system 300 includes a split sleeve 340, including a flare 342 and a body 346. The body 346 has a length L1 extending along a central axis thereof and an outer diameter D3, dimensioned to fit within the hole 354. The specific dimensions of the split sleeve 340 are critical. A hole 354 extends through at least a portion of the structure 350, e.g., to receive a fastener.

System 300 further includes a shim adapter housing 310, which includes a face wall 312 adapted to be positioned adjacent the structure 350. The face wall 312 has a first aperture 314 to be positioned adjacent the hole 354 and a side wall 316, depending from the face wall 312 to define a cavity 318. In some examples, the side wall 316 may define an annular ring, which depends from the face wall 312 and extends about a circumference of the shim adapter housing 310. In the example depicted in FIG. 3A, the face wall 312 has a thickness T2 proximate the first aperture 314 and the cavity 318 has an inner diameter, indicated by D5. The shim adapter housing 310 may be formed from a suitably rigid material, e.g., from a rigid polymer or a metal material.

System 300 also includes a shim plate 320, which may be dimensioned to fit within the cavity 318 defined by the face wall 312 of the shim adapter housing 310. The shim plate 320 has an aperture 324 to be positioned adjacent the first aperture 314 and a thickness T3 proximate the second aperture 324. In the example depicted in FIG. 3A, the shim plate 320 has a thickness T3 and an outer diameter D6. The aperture 324 has an inner diameter indicated by D2. Shim plate 320 may be formed from a suitably rigid material, e.g., from a rigid polymer or a metal material.

System 300 may also include a shim retainer 330, dimensioned to fit within the cavity 318. The shim retainer 330 has an aperture 334 to be positioned adjacent the aperture 324 and a thickness T4. In the example depicted in FIG. 3A, the shim retainer 330 has an outer diameter D7. The aperture 334 has an inner diameter indicated by D8. The shim retainer 330 may be formed from a suitably rigid material, e.g., from a rigid polymer or a metal material.

Figure 3B:
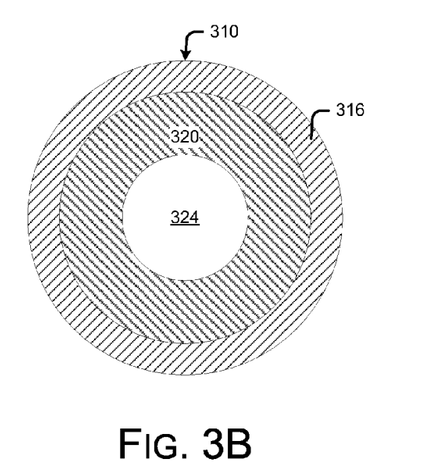
Figure 3C:
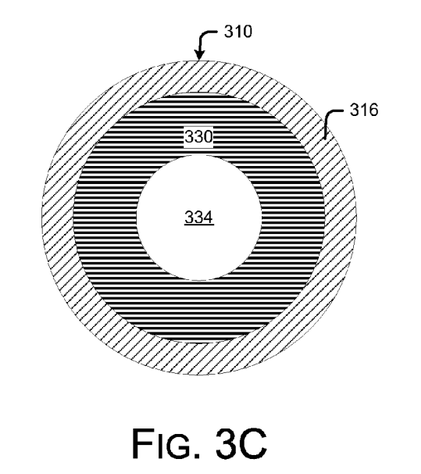

Having described various structural components of a system 300 to cold work metal/composite structures, methods to cold work a metal/composite structure will be described with reference to FIG. 4 and FIGS. 3B-3G. Referring first to FIG. 4, at operation 410 one or more shim plates 320 are positioned in the shim adapter housing 310. FIG. 3B is an end view of a shim adapter housing 310 with one or more shim plates 320, positioned therein. At operation 415, one or more shim retainers 330 may be positioned in the adapter housing 310. FIG. 3C is an end view of a shim adapter housing 310 with one or more shim retainers 330 positioned therein.

Figure 3D:
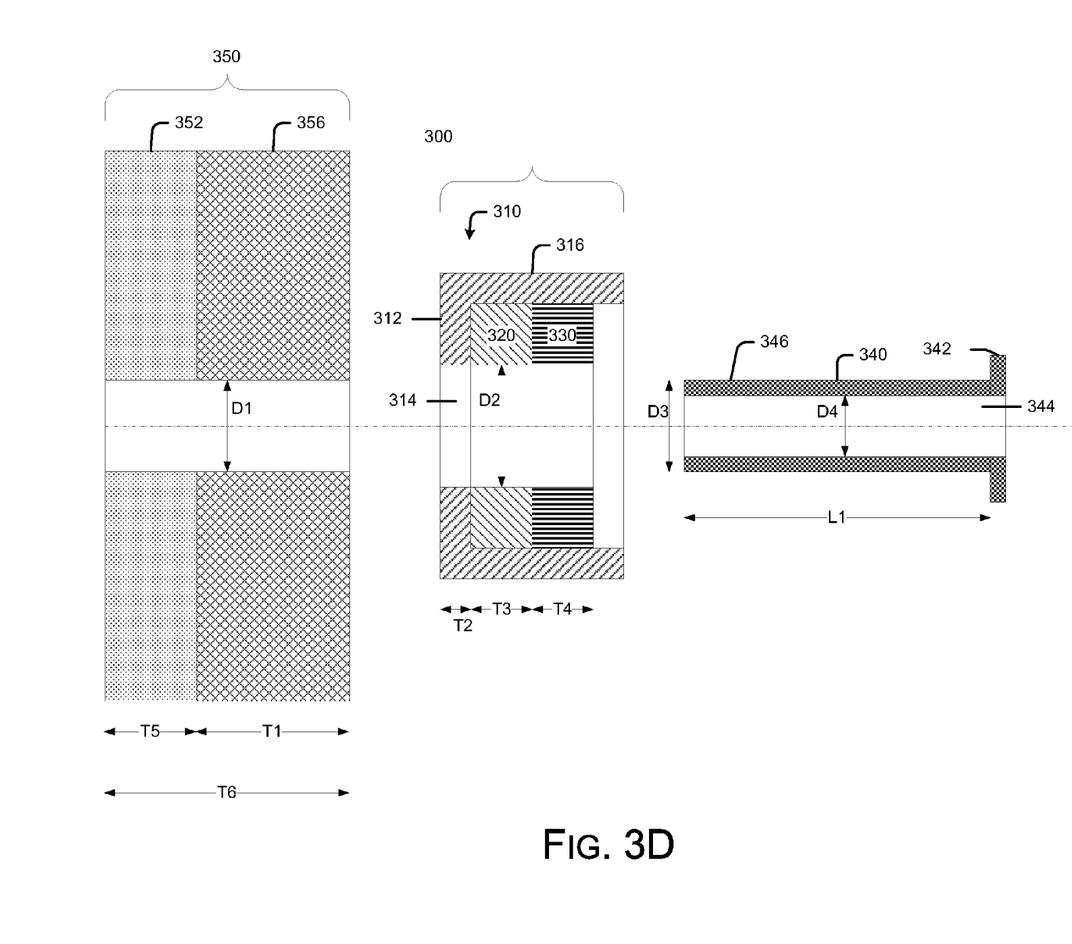
Figure 4:
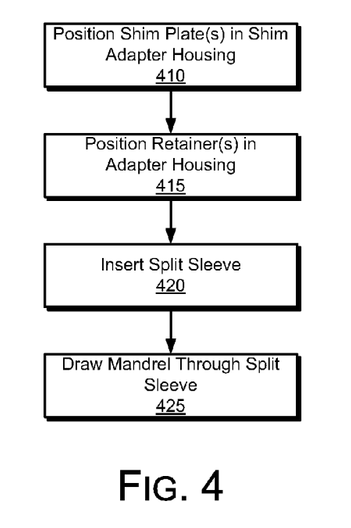
FIG. 4 is a flowchart illustrating operations in a method to cold work metal/composite structures, according to an aspect of the disclosure.

FIG. 3D is a side view of the system 300 with a shim plate 320 and a shim retainer 330 disposed in the shim adapter housing 310. In the example depicted in FIG. 3D, only a single shim plate 320 is positioned in the shim adapter housing 310. In practice, one or more shim plates 320 may be positioned in the shim adapter housing 310.

Figure 3E:
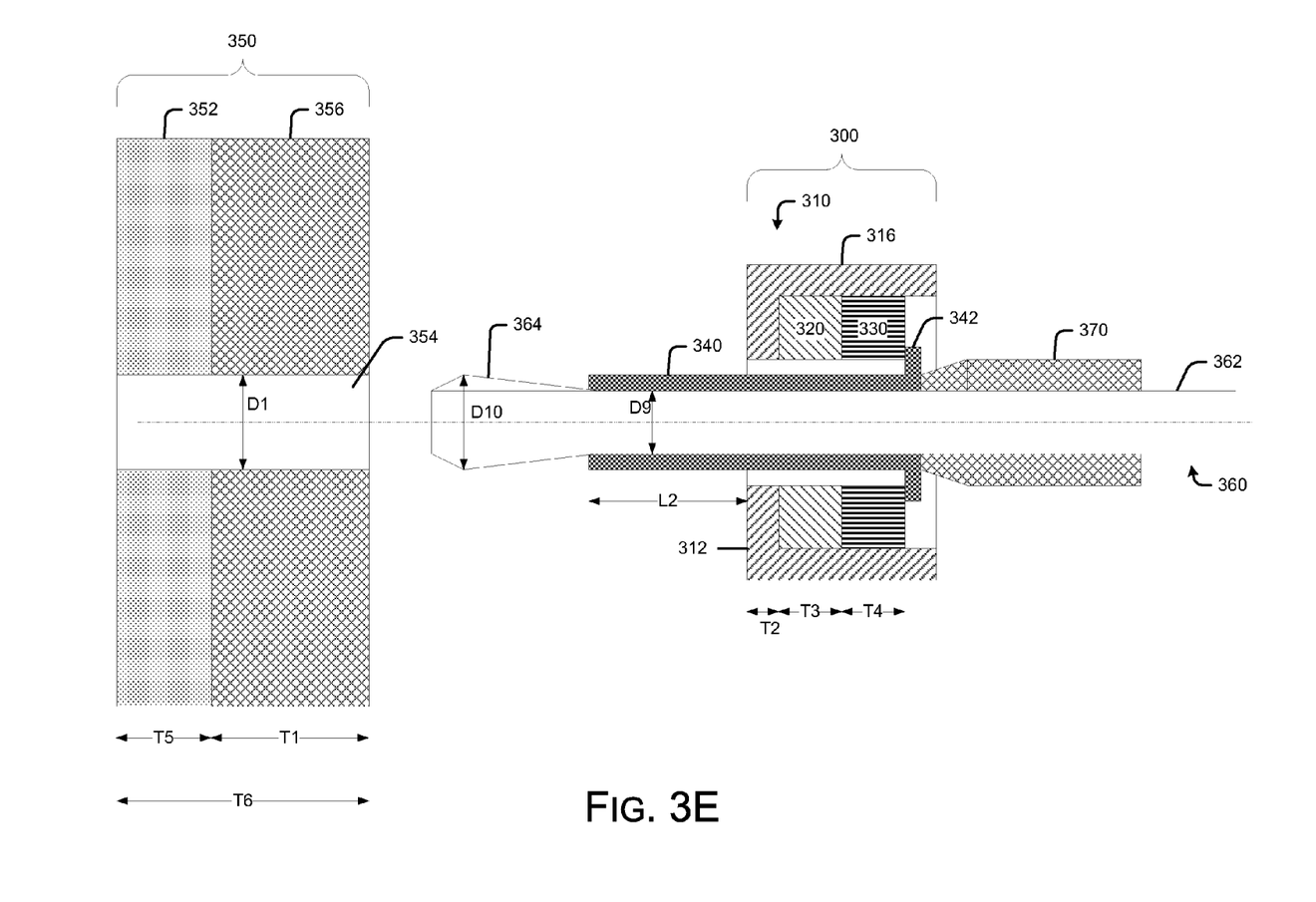
Figure 3F:
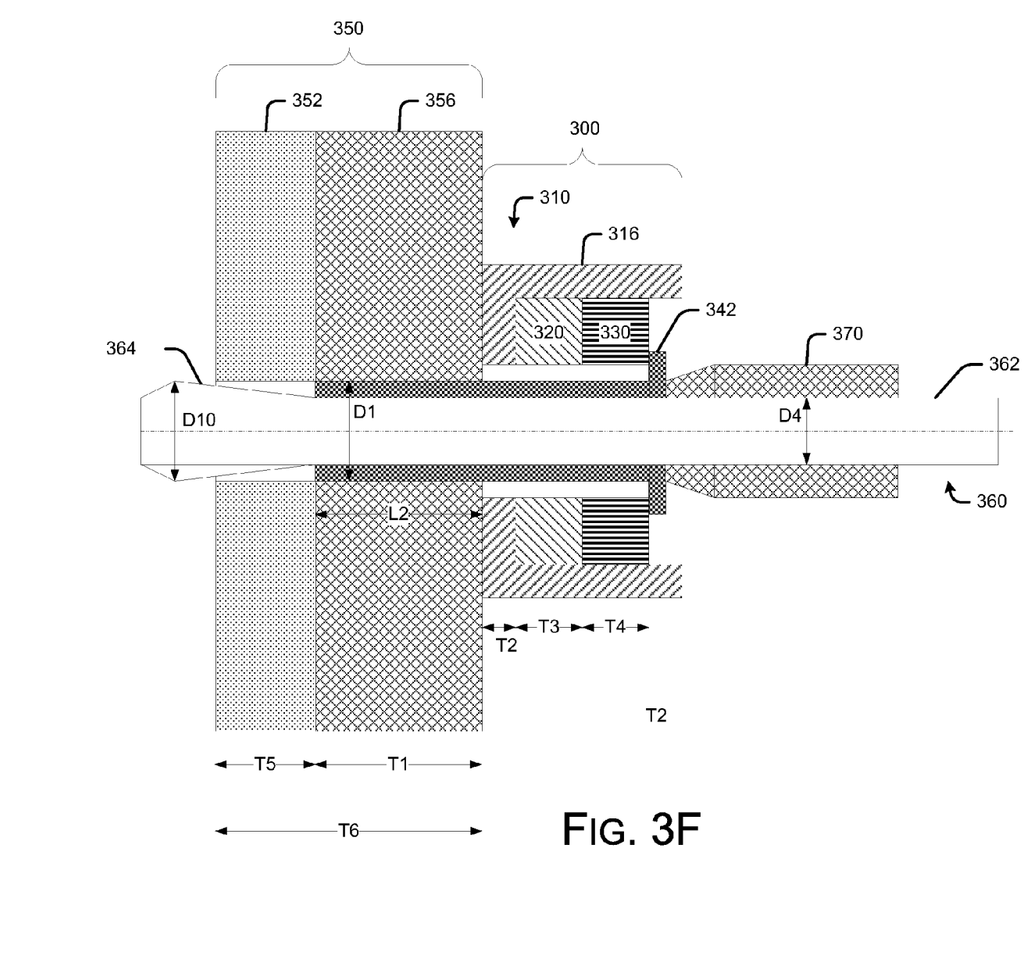
Figure 3G:
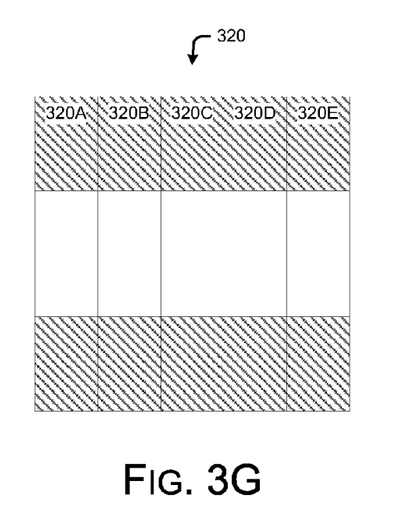

At operation 420, the body 346 of the split sleeve 340 is inserted into the composite structure 350. As illustrated in FIGS. 3E-3F, in some examples, the split sleeve 340 is positioned over a mandrel 360. The mandrel 360 has a shaft 362 and a head 364. The shaft 362 has a diameter D9, which is approximately equal to the inner diameter D4 of the split sleeve 340. The head 364 has a diameter D10, which is greater than the diameter of inner diameter D4 of the split sleeve 340, but smaller than the diameter D1 of the hole 354 in structure 350. The mandrel 360 may be inserted into the hole 354, such that the face wall 312 is adjacent the metal section 356 of the structure 350 (FIG. 3F).

The mandrel 360 may be drawn (operation 425) through the split sleeve 340, e.g., by using a retraction tool. In some examples, a nosepiece 370 may be positioned against the flare 342 of the split sleeve to hold the split sleeve in place. Drawing the head 364 of the mandrel 360 through the body 346 of the split sleeve 340 causes the body 346 of the split sleeve 340 to expand, thereby applying a compressive force to the metal section 350 of the structure 350.

In using the system 300 to cold work a metal section 356 of a structure 350, an operator may measure the thickness of the metal section and then select components of the system 300 such that the body 346 of the split sleeve 340 extends completely through the metal section 356 of the structure. The body 346 of the split sleeve 340 may extend slightly beyond the interface between the metal section 356 and the nonmetal section 352 of the structure. In some examples, the body 346 of the split sleeve 340 extends into the nonmetal section 352 about 5% to about 10% of the thickness of the nonmetal section 352.

Thus, in an example where the shim adapter housing 310 is not used, the operator may select the split sleeve 340 where the body has the length L1 and a number of shim plates 320 having the combined thickness T3, such that the length L1 minus the thickness T3 is at least as great as the thickness T1 of the metal layer 356.

In examples where the operator uses the shim adapter housing 310 and one or more shim plates 320, the operator may select the split sleeve 340 in which the body has the length L1, the face wall 312 of the shim adapter housing 310 has the thickness T2, and the one or more shim plates 320 have the thickness T3, such that the length L1 minus the sum of the thicknesses T2 and T3 is at least as great as the thickness T1.

In examples in which the operator uses the shim adapter housing 310, one or more shim plates 320, and the shim retainer 330, the operator may select the split sleeve 340 in which the body has the length L1, the face wall 312 of the shim adapter housing 310 has the thickness T2, shim plates 320 have the thickness T3, and the shim retainer 330 has the thickness T4, such that the length L1 minus the sum of the thicknesses T2, T3, and T4 is at least as great as the thickness T1.

As described above, in some examples, the shim plates 320 may be used without the housing 310 or the shim retainer 330. In such examples, a system for cold working a portion of the metal layer 356 surrounding the hole 354 in the structure 350 includes a split sleeve 340 including a uniform portion 346 having the length L1 and the outer diameter D3, dimensioned to be received within the hole 354 with a clearance fit between 0.001 and 0.003 inches, and the shim plate 320, including the aperture 324 that is larger than the mandrel major diameter D10 and twice the wall thickness of the sleeve 340 plus 0.001/0.003 inches. In some examples, the aperture 324 has a diameter D2 that is greater than the outer diameter D3 of the split sleeve.

The shim plates 320 have a thickness T3 which is adjustable. By way of example, referring to FIG. 3G, the shim plates 320 may be distributed in a stack or roll including a plurality of shim plates 320A, 320B, 320C, 320D, 320E. The shim plates 320 may be adhered to one another by an adhesive or a magnetic force, such that the respective shim plates 320 may be removed individually, e.g., by peeling a shim plate 320 from the stack.

Thus, some examples described herein provide a method of cold working a portion of the metal layer 356 having the thickness T1 located on a first side of a metal/composite structure 350. The portion of the metal layer 356 subject to cold working surrounds the hole 354 in the structure 350, which further includes the non-metal layer 352, having a thickness T5. The method includes locating the uniform portion 346 of the split sleeve 340 inside the hole 354. The uniform portion 346 has the length L1 which exceeds the thickness T1. The split sleeve 340 is fixed relative to the structure 350 and extends into the structure 350 from the first side a distance greater or equal to the thickness T1. A mandrel 360 is drawn through the split sleeve 340 to apply a radial and axial force to the portion of the metal layer 356 surrounding the hole 354.

In the description and claims, the terms coupled and connected, along with their derivatives, may be used. In particular examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although aspects of the disclosure have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An adapter assembly for a system for cold working a portion of a metal layer having a first thickness, the portion surrounding a hole in a structure that comprises the metal layer and an adjacent non-metal layer having a second thickness, the adapter assembly comprising:

a shim adapter housing comprising:
  a face wall having a first aperture that is larger than the hole;
  a side wall extending from the face wall, wherein a cavity is at least partially delimited by the face wall and the side wall; and
  a shim plate dimensioned to fit within the cavity, the shim plate having a second aperture that is larger than the hole; and
a split sleeve having a length and configured to be inserted into the hole through the second aperture of the shim plate and engage a solid mandrel drawn through the split sleeve during a cold working process,
wherein the shim plate has a thickness selected based on the length of the split sleeve such that, when the split sleeve is inserted into the hole through the second aperture during the cold working process, the split sleeve extends beyond the first thickness to less than 10% of the second thickness.

2. The adapter assembly of claim 1, wherein the shim plate comprises a plurality of layers.

3. The adapter assembly of claim 2, wherein the layers are detachably interconnected.

4. The adapter assembly of claim 1, further comprising a shim retainer dimensioned to fit within the cavity, the shim retainer having a third aperture to be positioned adjacent the second aperture.

5. A system to cold work a metal section having a first thickness proximate a hole in a structure comprising a non-metal section having a second thickness adjacent the metal section, the system comprising:
  a split sleeve comprising a flare and a body having a length L1 extending along a central axis and an outer diameter D3 dimensioned to fit within the hole;
  a shim adapter housing comprising:
    a face wall adapted to be positioned adjacent the structure, the face wall having a first aperture to be positioned adjacent the hole;
    a side wall depending from the face wall to define a cavity; and
    a shim plate dimensioned to fit within the cavity, the shim plate having a second aperture to be positioned adjacent the first aperture;
  the split sleeve configured to be inserted into the hole through the second aperture and to engage a solid mandrel drawn through the body of the split sleeve during a cold working operation,
  wherein the shim plate has a thickness selected based on the length L1 such that, when the split sleeve is inserted into the hole through the second aperture during the cold working operation, the split sleeve extends beyond the first thickness to less than 10% of the second thickness.

6. The system of claim 5, wherein:
  the metal section of the structure has a thickness T1 proximate the hole;
  the shim adapter housing has a thickness T2 proximate the first aperture; and
  the shim plate has a thickness T3 proximate the second aperture,
  wherein the length L1 minus a sum of the thickness T2 and the thickness T3 is at least as great as the thickness T1.

7. The system of claim 6, wherein the length L1 minus a sum of the thickness T2 and the thickness T3 exceeds the thickness T1 by an amount between about 5 percent and about 10 percent of a thickness T5 of the non-metal section of the structure.

8. The system of claim 5, further comprising a shim retainer dimensioned to fit within the cavity, the shim retainer having a third aperture to be positioned adjacent the second aperture.

9. The system of claim 8, wherein:
  the metal section of the structure has a thickness T1 proximate the hole;
  the shim adapter housing has a thickness T2 proximate the first aperture;
  the shim plate has a thickness T3 proximate the second aperture; and
  the shim retainer has a thickness T4 proximate the third aperture,
  wherein the length L1 minus a sum of the thickness T2, the thickness T3, and the thickness T4 is at least as great as the thickness T1.

10. The system of claim 9, wherein the length L1 minus a sum of the thickness T2, the thickness T3, and the thickness T4 exceeds the thickness T1 by an amount between about 5 percent and about 10 percent of a thickness T5 of the non-metal section of the structure.

11. A method to cold work a metal section proximate a hole in a structure the metal section having a first thickness and positioned adjacent to a non-metal section having a second thickness, the method comprising:
  positioning a shim adapter housing adjacent the hole in the structure, the shim adapter housing comprising:
    a face wall adapted to be positioned adjacent the structure, the face wall having a first aperture to be positioned adjacent the hole; and
    a side wall depending from the face wall to define a cavity;
  positioning a shim plate within the cavity, the shim plate having a second aperture to be positioned adjacent the first aperture;
  inserting a split sleeve through the second aperture, the split sleeve comprising a flare and a body, the body having a length extending along a central axis and having an outer diameter dimensioned to fit within the hole; and
  drawing a mandrel through the body of the split sleeve,
  wherein the mandrel causes the split sleeve to apply a compressive force to the metal section of the structure, and
  wherein the shim plate has a thickness selected based on the length of the body of the split sleeve such that, when the split sleeve is inserted into the hole through the second aperture during cold working, the split sleeve extends beyond the first thickness to less than 10% of the second thickness.

12. The method of claim 11, further comprising positioning a shim retainer within the cavity, the shim retainer having a third aperture to be positioned adjacent the second aperture.

13. The method of claim 12, wherein:
  the metal section of the structure has a thickness T1 proximate the hole;
  the shim adapter housing has a thickness T2 proximate the first aperture;
  the shim plate has a thickness T3 proximate the second aperture; and
  the shim retainer has a thickness T4 proximate the third aperture,
  wherein the length L1 minus a sum of the thickness T2, the thickness T3, and the thickness T4 is at least as great as the thickness T1.

14. The method of claim 13, wherein the length L1 minus sum of the thickness T2, the thickness T3, and the thickness T4 exceeds the thickness T1 by an amount between about 5 percent and about 10 percent of a thickness T5 of the non-metal section of the structure.

15. A system for cold working a portion of a metal layer with a first thickness in a structure, the portion surrounding a hole in the structure which further includes a non-metal layer with a second thickness adjacent to the metal layer, the system comprising:
- a split sleeve including a body having a length L1 and an outer diameter D3 dimensioned to be received within the hole; and
- a shim plate including an aperture that is larger than the hole;
- wherein the split sleeve is configured to be inserted into the hole through the aperture of the shim plate and engage a solid mandrel drawn through the body of the split sleeve during a cold working process, and
- wherein the shim plate has a thickness selected based on the length L1 such that, when the split sleeve is inserted into the hole through the aperture during the cold working process, the split sleeve extends beyond the first thickness to less than 10% of the second thickness.

16. The system of claim 15, wherein the thickness of the shim plate is adjustable.

17. The system of claim 15, wherein
- the metal layer of the structure has a thickness T1 proximate the hole;
- the non-metal layer of the structure has a thickness T5;
- the shim plate has a thickness T3 proximate the aperture; and
- the length L1 minus the thickness T3 is at least as great as the thickness T1.

18. The system of claim 17, wherein the length L1 minus the thickness T3 is greater than the thickness T1 by an amount that is within 5 to 10 percent of the thickness T5.

19. The system of claim 17, wherein the aperture has a diameter D2 that is greater than the outer diameter D3 of the split sleeve.

20. A method of cold working a portion of a metal layer having a thickness T1 and located on a first side of a structure, the portion surrounding a hole in the structure which further includes a non-metal layer having a thickness T5, the method comprising:
- locating a uniform portion of a split sleeve inside the hole, the uniform portion having a length L1 which exceeds the thickness T1, wherein the split sleeve is fixed relative to the structure and extends into the structure from the first side a distance greater or equal to the thickness T1; and
- drawing a mandrel through the split sleeve and a shim plate to apply a compressive force to the portion of the metal layer surrounding the hole,
- wherein the shim plate has a thickness selected based on the length L1 such that, when the split sleeve is located inside the hole during cold working, the split sleeve extends beyond the thickness T1 to less than 10% of the thickness T5.

* * * * *